VOLTAGE WAVEFORM

INVENTOR.
S. S. HARBAUGH
BY
ATTORNEY

United States Patent Office 3,253,235
Patented May 24, 1966

3,253,235
INVERTER CIRCUIT WITH VARIABLE SATURABLE REACTOR FREQUENCY CONTROL
Samuel S. Harbaugh, Pittsburgh, Pa., assignor to Western Electric Company, Incorporated, New York, N.Y., a corporation of New York
Filed May 22, 1963, Ser. No. 282,361
4 Claims. (Cl. 331—113)

This invention relates to systems for converting unidirectional voltages into multidirectional voltages, and more particularly to transistorized inverter systems having variable frequency outputs.

In the past, transistorized inverter systems have been devised for producing multidirectional output voltages of controlled variable frequencies from unidirectional input voltages. However, conventional methods of varying the output frequencies of such systems by varying the unidirectional input voltages have the undesirable effect of also varying the amplitudes of the output voltages as well as reducing the overall efficiency of the systems. Thus, it is desirable to have an inverter system whose output frequency can be varied without varying the amplitude of the output voltage and without sacrificing inverter efficiency. It is also highly desirable to eliminate voltage spikes and delays between the positive and negative half cycles of the output voltage of the conventional inverter system.

Accordingly, it is a primary object of the present invention to provide a relatively simple and efficient system for converting a unidirectional voltage into a multidirectional voltage.

Another object of the invention resides in the provision of a transistorized inverter system having an output frequency which may be varied without varying the amplitude of the output voltage and without sacrificing the efficiency of the inverter.

With these and other objects in view, the present invention contemplates an inverter system for converting a unidirectional voltage into a multidirectional voltage. The system includes a saturable magnetic core and first and second semiconductive means. The semiconductive means are connected to a source of unidirectional voltage and are magnetically coupled to the saturable magnetic core to produce a magnetic flux in such core in opposite directions. Control means are magnetically coupled to the core and respond to the flux therein to successively actuate and de-actuate the first and second semiconductive means before the flux in the magnetic core is able to saturate such core. A transformer winding is coupled to the magnetic core and responds to the control means to produce a multidirectional output pulse at the terminals of the transformer winding.

Other objects and advantages of the present invention will be apparent from the following detailed description when considered in conjunction with the accompanying drawing, wherein.

Figure 1:
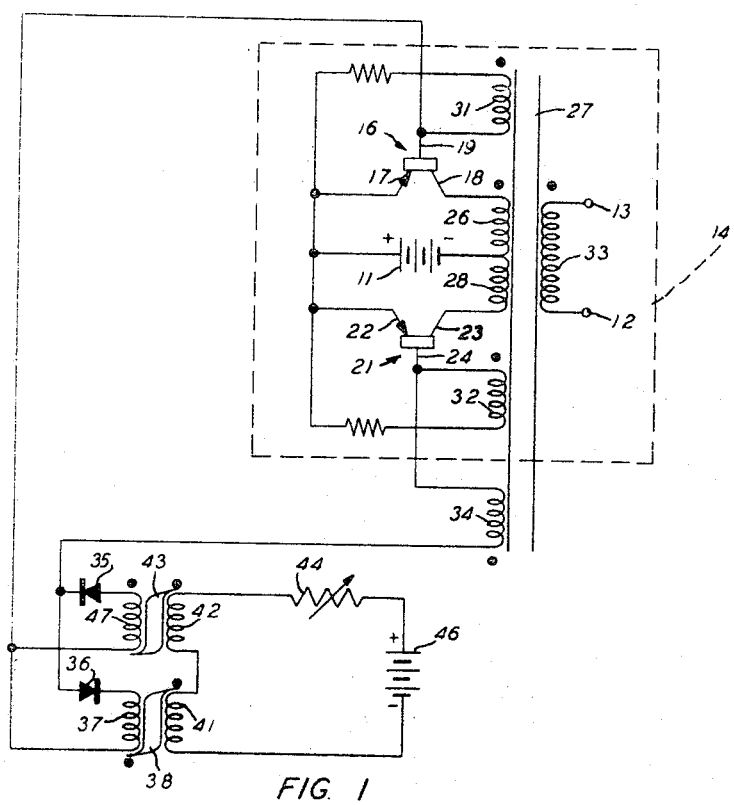
FIG. 1 illustrates a variable frequency system for converting a unidirectional voltage into a multidirectional voltage.

Referring now to FIG. 1 of the drawing, there is shown a variable frequency system for converting a unidirectional voltage from a source 11 into a multidirectional voltage at output terminals 12 and 13. Such a system is astable and is frequently referred to as an "inverter." The system includes a basic or conventional network 14 (see R. L. Bright et al. Patent 2,783,384) which is modified as shown in FIG. 1 to enable the frequency of the multidirectional output voltage appearing at terminals 12 and 13 to be varied without affecting the amplitude of such output voltage and without sacrificing the overall efficiency of the inverter.

The basic network 14 includes a first transistor 16 of the PNP type having an emitter 17, a collector 18 and a base 19 and also includes a second transistor 21 of the PNP type having an emitter 22, a collector 23 and a base 24. Since no two transistors are exactly identical, an unbalanced condition exists when the transistors 16 and 21 are connected within the circuit of the basic network 14 of FIG. 1. Therefore, either transistor 16 or 21 conducts.

Assuming initially then that transistor 21 does not conduct, while transistor 16 does conduct, the impedance of the transistor 16 is relatively small as compared to the impedance of the transistor 21. Therefore, substantially the entire voltage of the source 11 is applied across a winding 26 formed on a saturable core 27, while no voltage of the source 11 is applied to another winding 28 formed on the same core 27.

The saturable core 27 possesses a substantially rectangular hysteresis loop. Hence, when the voltage of the source 11 is applied to the winding 26 of the core 27, a current is produced in the winding 26 for establishing a magnetomotive force to direct magnetic flux through the core 27. This flux increases substantially linearly with respect to time due to the constant value of the voltage of source 11. Such increasing magnetic flux induces voltages of substantially constant magnitude. In particular, the voltage induced in the winding 33 and appearing at the terminals 12 and 13 is the output voltage of the system and is graphically represented by the portion of the voltage waveform of FIG. 2 delineated by O, a and b. Moreover, voltages having substantially the same waveform are induced in the associated windings 28, 31, 32, and 34 formed on the core 27.

With the polarities as indicated by the conventional dots in FIG. 1, the voltage induced in the winding 31 places a voltage across the base 19 and the emitter 17 of the transistor 16 to render the base 19 negative with respect to the emitter 17. This voltage across the base 19 and emitter 17 sustains the conduction of the transistor 16. Moreover, the voltage induced in the winding 32 establishes a voltage acros the base 24 and the emitter 22 of the transistor 21 to render the base 24 positive with respect to the emitter 22. This prevents conduction of the transistor 21.

The voltage produced by the winding 34 is blocked by a diode 35, is passed by a diode 36 and is applied across a winding 37 formed about a saturable core 38. The core 38 has a substantially rectangular hysteresis loop, as shown graphically by the outline of the core 38 in FIG. 1. Also formed about the saturable core 38 is another winding 41 having a relative polarity opposite that of the winding 37, as shown by the conventional dots in FIG. 1. The winding 41 is serially connected to a similar winding 42 of the same relative polarity. This winding 42 is formed about another saturable core 43 having substantially the same magnetic characteristics as the core 38. The winding 42 is serially connected to a variable resistor 44 and to a control voltage source 46 for producing a magnetizing direct current. The magnitude of this magnetizing current, which passes through the winding 41, is controlled by the variable resistor 44 and determines the limit at which the current in the winding 37 produces a magnetomotive force in the core 38 sufficient to overcome the flux produced by the magnetizing current and to saturate such core 38 with magnetic flux in the direction opposite to the flux produced by the magnetizing current before the core 27 is saturated. The core 38 along with windings 37 and 41, as well as the core 43 along with wnidings 42 and 47 may be referred to as saturable core reactors.

Upon the application of the voltage from the winding 34 to the winding 37 through the diode 36, a current is produced in such winding 37 for establishing a magnetomotive force to direct magnetic flux through the core 38. This flux increases at a constant rate under the influence of the current produced by the voltage which is applied to the winding 37. When the flux in the core 38 reaches its saturation value and can no longer increase, the back electromotive force in the winding 37 drops to zero. Effectively, the saturated core 38 loses its inductive reactance characteristic; it is less able to prevent current from flowing through the winding 37. Consequently, the voltage produced in the winding 34 is applied across the base 19 of the transistor 16 and the base 24 of the transistor 21 to overcome the bias applied to the bases 19 and 24 by the windings 31 and 32, respectively, and to make the base 19 positive with respect to the base 24. Since the respective emitters 17 and 22 of the transistors 16 and 21 are electrically connected, the voltage on the base 19 is made positive with respect to the emitter 17 and the voltage on the base 24 is made negative with respect to the emitter 22. Thus, following the reduction of voltage across the winding 37 due to the saturation of the core 38, the voltage produced in the winding 34 terminates the conduction of the transistor 16 and simultaneously initiates conduction of the transistor 21 *before* the core 27 is saturated.

Figure 2:
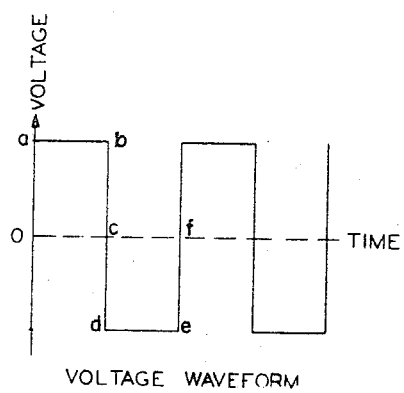
FIG. 2 illustrates the output voltage waveform produced by the system of FIG. 1.

Due to the termination of the conduction of the transistor 16, the output voltage appearing at terminals 12 and 13 falls to zero, as shown by *b* and *c* on the voltage waveform of FIG. 2.

Since the transistor 21 is now conducting, substantially the entire voltage from source 11 appears across the winding 28 for establishing a current therein. This current produces a magnetomotive force for directing a magnetic flux through the core 27 and thereby induces voltages in the associated windings 26, 31, 32, 33, and 34 of polarities opposite to that previously produced by the current which previously existed in the winding 26. Such induced voltages are represented by *c*, *d* and *e* on the waveform of FIG. 2.

Moreover, the voltage now induced in the winding 34 by the conduction of the transistor 21 is opposite in polarity to the voltage previously induced in such winding 34 by the conduction of the transistor 16. This voltage now induced in the winding 34 is blocked by the diode 36 and passed by the diode 35; whereupon, a current is produced in a winding 47 formed on the saturable core 43. This current establishes a magnetomotive force for directing magnetic flux through the core 43 to eventually overcome the opposing flux produced by the magnetizing current through the winding 42 and saturate such core 43. After the core 43 becomes saturated, the voltage in the winding 34 is again applied across the base 19 of the transistor 16 and base 24 of the transistor 21, to interchange the operating condition of the transistors 16 and 21. When the core 43 is saturated, the output voltage appearing at terminals 12 and 13 changes from *e* to *f* on the voltage waveform of FIG. 2.

Thus, transistors 16 and 21 have interchanged their operating condition and periodically continue to do so. Accordingly, a multidirectional voltage output is produced at terminals 12 and 13, as shown by the voltage waveform of FIG. 2.

Figure 3:
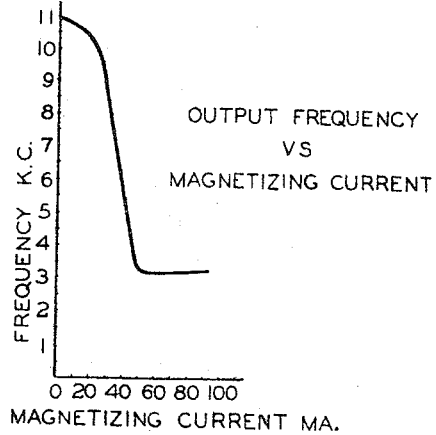
FIG. 3 illustrates graphically the manner in which the output frequency of the system of FIG. 1 varies with the magnitude of the magnetizing current.

The frequency of the multidirectional output voltage is controlled by the magnitude of the magnetizing current in the windings 41 and 42 of the cores 38 and 43. In turn, this current is controlled by the resistance value of the variable resistor 44. The manner in which the frequency of the multidirectional output voltage at terminals 12 and 13 varies with the magnitude of the magnetizing current is shown graphically in FIG. 3. Since the magnetic flux produced by the magnetizing current opposes the flux produced by the current in either the winding 37 or 47, a longer time is required to saturate either the core 38 or the core 43 when the magnetizing current is greater.

By interchanging the operation of the transistors 16 and 21 before the core 27 becomes saturated, the frequency of the multidirectional output voltage appearing at the terminals 12 and 13 may be varied without affecting the amplitude of such output voltage and without sacrificing the overall efficiency of the system.

Moreover, with the improved inverter system of FIG. 1, voltage spikes on the leading edge of the output waveform are eliminated. This is highly desirable because such voltage spikes may damage transistors or the load connected to the inverter system. In addition, inherent delays between the positive and negative half cycles of the conventional inverter network have been eliminated by the improved inverter system.

It should be understood that the above-described embodiments of the invention are merely illustrative and that numerous modifications may be made within the spirit and scope of the invention. Further, the particular apparatus illustrated is only one example of several types of apparatus which may be included in practicing the invention and the invention is not limited solely to the use of this apparatus.

What is claimed is:
1. In an inverter system,
a first saturable magnetic core,
a source of unidirectional voltage,
a first amplifier having output means connected to the source and coupled to the first core for producing a magnetic flux in said first core in a first direction,
a second amplifier having output means connected to the source and coupled to the first core for producing a magnetic flux in said first core in a second direction,
means coupled to said first core and connected to the inputs of said first and second amplifiers for applying biasing potentials to the inputs of said amplifiers such that increasing flux in the first direction in said first core biases said first amplifier conductive and said second amplifier non-conductive and increasing flux in the second direction biases said first amplifier non-conductive and said second amplifier conductive,
a first winding on said first core connected in series with inputs of said first and second amplifiers and responsive to increasing flux in the first and the second directions for producing voltages of polarities opposite to the biasing potentials on the inputs of said first and second amplifiers,
a second saturable magnetic core,
a second winding formed about said second core connected in series with the inputs of said first and second amplifiers and said first winding,
a first diode connected in series with said first and second windings and the inputs of said first and second amplifiers so that only currents of a first polarity pass through the second winding to saturate the second core to apply switching voltages to the inputs of said first and second amplifiers in response to the saturation of said second core,
a third saturable magnetic core,
a third winding formed about said third core connected in series with the inputs of said first and second amplifiers and said first winding,
a second diode having a polarity opposite to that of said first diode and connected in series with said first and third windings and the inputs of said first and second amplifiers so that only currents of a second polarity pass through the third winding to saturate the third core to apply switching voltages to said first and second amplifiers in response to the saturation of said third core, a fourth winding formed about said second core,
a fifth winding formed about said third core and serially interconnected with said fourth winding,
a source of direct current serially connected to said fourth and fifth windings,
means coupled to said first core for producing a multidirectional output pulse, and
means for controlling the magnitude of the current in said fourth and fifth windings to control the rate at which said second and third cores saturate to thereby control the frequency of the output pulse.

2. In a system for converting a unidirectional voltage into a multidirectional voltage,
a first saturable magnetic core,
a first and second transistor each having a base, an emitter and a collector,
a first transformer winding formed about said first core and having a pair of end taps connected respectively to the collectors of said transistors and having a center tap for alternately and successively producing a magnetic flux in said first core in a first and second direction,
an input source of unidirectional current having one terminal thereof connected to said center tap and the other terminal thereof connected to and joining the emitters of said transistors,
a pair of second transformer windings formed about said first core and connected respectively between the emitters and bases of said first and second transistors for biasing the first transistor conductive and the second transistor non-conductive in response to an increasing magnetic flux in a first direction in the first core,
a control transformer winding formed about said first core connected in series with the bases of said first and second transistors for producing a voltage which has a polarity opposite to the voltage applied by the second windings to the base of the first transistor with respect to the base of the second transistor in response to an increasing magnetic flux in the first direction in the first core,
a second and a third saturable magnetic core having substantially the same magnetic characteristics,
a third transformer winding formed about said second core connected in series with the bases of said first and second transistors and the control winding,
a first diode connected in series with said third winding, said control winding, and the bases of said first and second transistors so that only currents of a first polarity pass through said third winding to saturate said second core to apply voltages to the bases of said first and second transistors to bias said first transistor non-conductive and said second transistor conductive in response to the saturation of said second core,
a fourth transformer winding formed about said third core connected in series with the bases of said first and second transistors and the control winding,
a second diode having a polarity opposite to that of said first diode connected in series with said fourth winding, said control winding, and the bases of said first and second transistors so that only currents of a second polarity pass through said fourth winding to saturate said third core to apply voltages to the bases of said first and second transistors to bias said first transistor conductive and said second transistor non-conductive in response to the saturation of said third core,
a fifth transformer winding formed about said second core,
a sixth transformer winding formed about said third core and serially interconnected with said fifth winding,
a direct current source of magnetizing current serially connected to said fifth and sixth windings, a variable resistor serially interconnected between said source of magnetizing current and said fifth winding for controlling the magnitude of the magnetizing current in said fifth and sixth windings to control the rate at which said second and third cores saturate, and
an output transformer winding formed about said first core and responsive to the successive saturation of said second and third cores for producing a multidirectional output voltage at the terminals thereof.

3. In an inverter system,
a first saturable magnetic core,
a source of unidirectional voltage,
a first amplifier having output means connected to the source and coupled to the first core for producing a magnetic flux in said first core in a first direction,
a second amplifier having output means connected to the source and coupled to the first core for producing a magnetic flux in said first core in a second direction,
means coupled to said first core and connected to the inputs of said first and second amplifiers for applying biasing potentials to the inputs of said amplifiers such that increasing flux in the first direction in said first core biases said first amplifier conductive and said second amplifier non-conductive and increasing flux in the second direction biases said first amplifier non-conductive and said second amplifier conductive,
a first winding on said first core connected in series with inputs of said first and second amplifiers and responsive to increasing flux in the first and the second directions for producing voltages of polarities opposite to the biasing potentials on the inputs of said first and second amplifiers,
a second saturable magnetic core,
a second winding formed about said second core connected in series with the inputs of said first and second amplifiers and said first winding,
a first diode connected in series with said first and second windings and the inputs of said first and second amplifiers so that only currents of a first polarity pass through the second winding to saturate the second core to apply switching voltages to the inputs of said first and second amplifiers in response to the saturation of said second core,
a third saturable magnetic core,
a third winding formed about said third core connected in series with the inputs of said first and second amplifiers and said first winding,
a second diode having a polarity opposite to that of said first diode and connected in series with said first and third windings and the inputs of said first and second amplifiers so that only currents of a second polarity pass through the third winding to saturate the third core to apply switching voltages to said first and second amplifiers in response to the saturation of said third core,
means coupled to said first core for producing a multidirectional output pulse, and
means for controlling the magnitude of magnetic flux in said second core to thereby control the output pulse.

4. In an inverter system,
a first saturable magnetic core,
a source of unidirectional voltage,
a first amplifier having output means connected to the source and coupled to the first core for producing a magnetic flux in said first core in a first direction,
a second amplifier having output means connected to the source and coupled to the first core for producing a magnetic flux in said first core in a second direction,
means coupled to said first core and connected to the inputs of said first and second amplifiers for applying biasing potentials to the inputs of said amplifiers such that increasing flux in the first direction in said first core biases said first amplifier conductive and said second amplifier non-conductive and increasing flux in the second direction biases said first amplifier non-conductive and said second amplifier conductive, a first winding on said first core connected in series with inputs of said first and second amplifiers and responsive to increasing flux in the first and the second directions for producing voltages of polarities opposite to the biasing potentials on the inputs of said first and second amplifiers, a second saturable magnetic core, a second winding formed about said second core connected in series with the inputs of said first and second amplifiers and said first windings, a first diode connected in series with said first and second windings and the inputs of said first and second amplifiers so that only currents of a first polarity pass through the second winding to saturate the second core to apply switching voltages to the inputs of said first and second amplifiers in response to the saturation of said second core, a third saturable magnetic core, a third winding formed about said third core connected in series with the inputs of said first and second amplifiers and said first winding, a second diode having a polarity opposite to that of said first diode and connected in series with said first and third windings and the inputs of said first and second amplifiers so that only currents of a second polarity pass through the third winding to saturate the third core to apply switching voltage to said first and second amplifiers in response to the saturation of said third core, means including a fourth winding formed about said second core, a source of direct current serially connected to said fourth winding, means coupled to said first core for producing a multi-directional output pulse, and means for controlling the magnitude of the current in said fourth winding to thereby control the output pulse.

References Cited by the Examiner
UNITED STATES PATENTS

| | | | |
|---|---|---|---|
| 2,774,878 | 12/1956 | Jensen | 331—113 |
| 2,848,614 | 8/1958 | Lyons | 331—113 |
| 2,937,298 | 5/1960 | Putkovich et al. | 313—108 |
| 3,015,772 | 1/1962 | Rochelle. | |
| 3,146,406 | 8/1964 | Wilting | 331—113 |

ROY LAKE, *Primary Examiner.*

S. H. GRIMM, *Assistant Examiner.*